(12) United States Patent
Morley et al.

(10) Patent No.: US 7,574,558 B2
(45) Date of Patent: *Aug. 11, 2009

(54) SECTOR-EDGE CACHE

(75) Inventors: Steven A. Morley, Upton, MA (US); Joel J. Young, Milford, MA (US)

(73) Assignee: EMC Corporation, Hopkinton, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/855,400

(22) Filed: Sep. 14, 2007

(65) Prior Publication Data

US 2008/0005467 A1 Jan. 3, 2008

Related U.S. Application Data

(63) Continuation of application No. 11/094,118, filed on Mar. 30, 2005, now Pat. No. 7,277,986.

(51) Int. Cl.
*G06F 13/00* (2006.01)
(52) U.S. Cl. ...................... 711/113; 711/118
(58) Field of Classification Search .......... 711/113, 711/118
See application file for complete search history.

(56) References Cited

U.S. PATENT DOCUMENTS 5,522,049 A * 5/1996 Kimura et al. ............. 710/301
5,813,025 A * 9/1998 Murphy et al. ............. 711/114
6,191,712 B1 * 2/2001 Still ........................... 341/95
6,725,342 B1 * 4/2004 Coulson ..................... 711/141
7,215,496 B1 * 5/2007 Kupferman et al. ......... 360/51
2005/0036381 A1 * 2/2005 Hassner et al. ............. 365/222

* cited by examiner

*Primary Examiner*—Reba I. Elmore
(74) *Attorney, Agent, or Firm*—Guerin & Rodriguez, LLP; Michael A. Rodriguez

(57) ABSTRACT

Software that writes to storage disks using a differently sized sector format than that of the storage disks can require sector edges to be read from sectors of the disks before the write operation can occur. Write operations can consequently incur a performance penalty by having to pre-read sector edges. A sector-edge cache avoids this performance penalty by storing sector edges obtained from the sectors during previously executed read and write operations. Instead of having to pre-read a sector edge from disk during a write operation, an input/output controller can examine the sector-edge cache to determine if each appropriate sector edge is already present and then combine new data with that cached sector edge. RAID-5 implementations, which use a read-modify-write process to perform write operations, benefit from sector caches by reading and caching sector edges during the read phase so that no additional pre-reads are needed during the write phase.

15 Claims, 7 Drawing Sheets

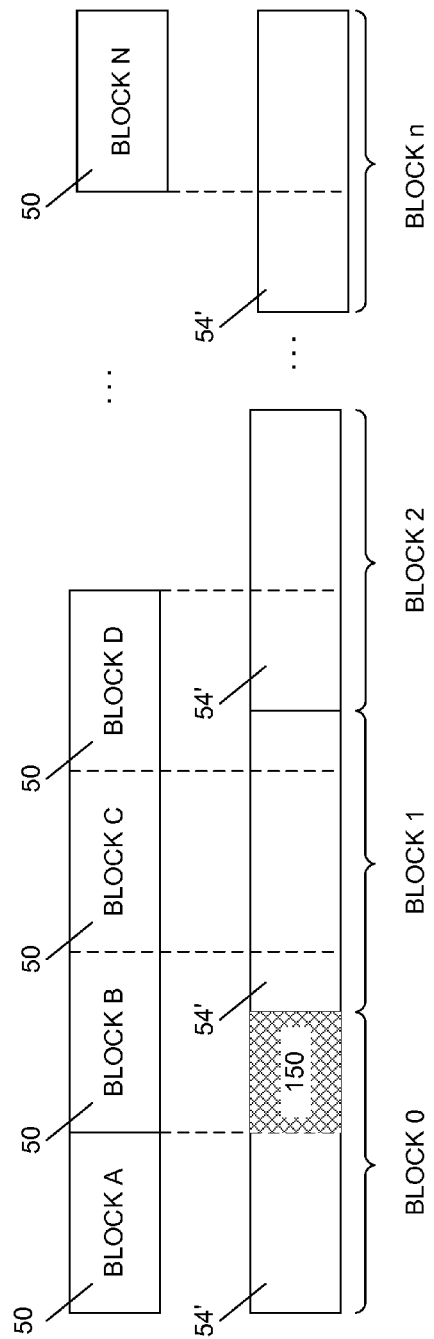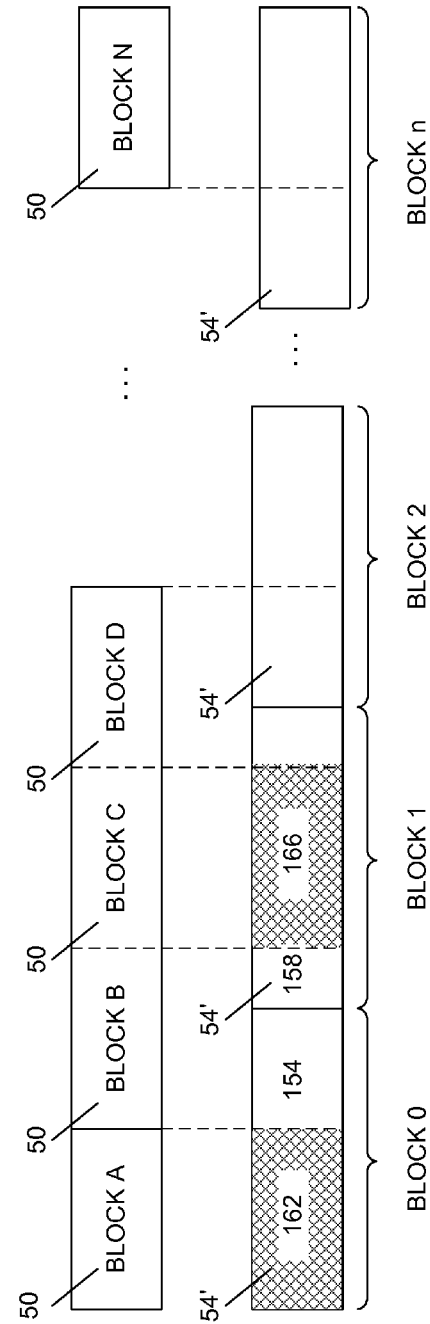
FIG. 8
FIG. 9

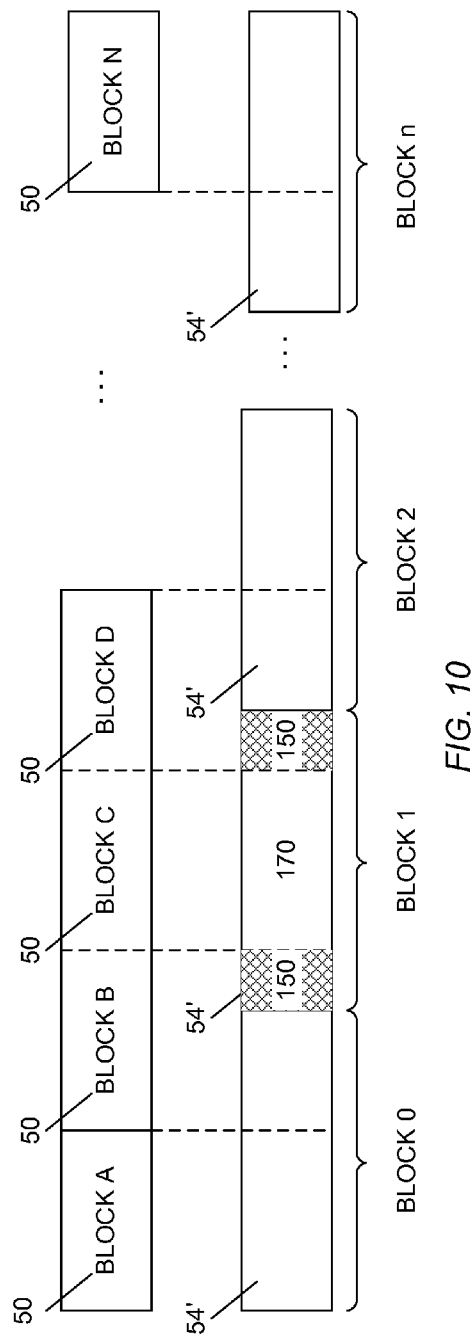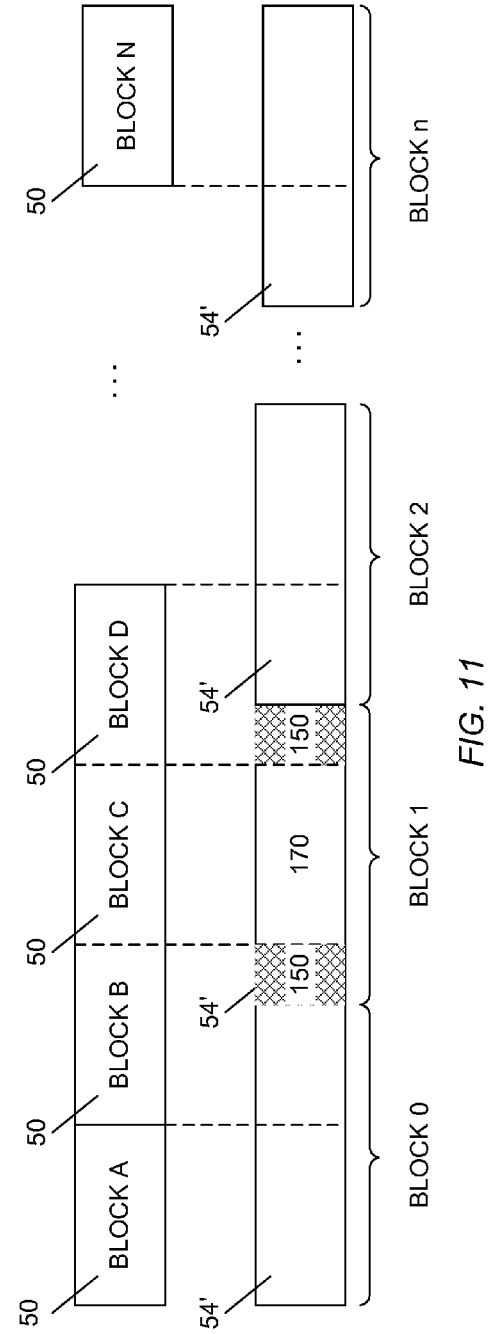

SECTOR-EDGE CACHE

RELATED APPLICATION

This application is a continuation application claiming the benefit of the filing date of co-pending U.S. patent application Ser. No. 11/094,118, filed Mar. 30, 2005, titled "Sector-edge Cache," the entirety of which U.S. patent application is hereby incorporated by reference.

FIELD OF THE INVENTION

The invention relates generally to data processing systems employing hard drive storage technology. More particularly, the invention relates to a sector-edge cache for improving system performance during write operations to disk.

BACKGROUND

Low cost has made ATA (Advanced Technology Attachment) disk drives a popular choice for data storage in various data processing systems. The development of the Serial ATA (SATA) protocol has furthered this popularity by providing features such as hot-pluggability, flexible cabling, and CRC (cyclic redundancy check) for all data, command, and status communications. In addition, the storage density of ATA disk drives makes them particularly advantageous for large-capacity storage systems. Accordingly, Redundant Array of Independent Disks (RAID) implementations, which have traditionally employed SCSI or Fibre Channel disk drive technologies, are currently adopting the use of ATA disk drives.

Current ATA disk drives, however, only support a standard-sized sector format of 512 bytes, whereas applications or other software that interact with the disk drives, such as a RAID implementation, can require sectors of a different size. A sector is the smallest unit for which an access can be made to the disk. The difference in sector size requires address translation between the addresses and sectors specified by an application, referred to as logical addresses and logical sectors, and the physical addresses and physical sectors of the disk drive. This sector-size difference also produces a misalignment between logical and physical sectors of the disk drives. For example, if a logical sector is larger (in bytes) than a physical sector, then the logical sector overlaps multiple physical sectors. Consequently, a write operation to a logical sector is, in effect, a write operation to multiple physical sectors, although portions of one or of all of these physical sectors are not being written to. These portions are located at the edges of the overlap between the logical sector and the physical sectors; such edges are referred to as sector edges. This write operation can require an additional read I/O operation to obtain data from the sector edges. Additional read I/O operations of sector edges thus have performance implications for applications that perform small write or large misaligned write operations. To capitalize on the various advantages of ATA technology, therefore, there is a need for a system and method that can avoid or mitigate the performance penalty incurred by reading the sector edges during write operations.

SUMMARY

In one aspect, the invention features a method of handling input/output (I/O) requests to a storage disk, wherein the I/O requests use a different sector size format that that of the storage disk. The method comprises receiving a write request to write data to a logical sector of a virtual disk. The logical sector maps to one or more physical sectors of a storage disk. A sector edge for each physical sector to which the logical sector maps is identified. Each identified sector edge is retrieved from a sector-edge cache if the sector-edge cache presently holds a valid entry for that sector edge. Each retrieved sector edge is combined with the data being written, which is written to the one or more physical sectors to which the logical sector maps.

In another aspect, the invention features a data processing system having a storage disk with physical sectors. The data processing system includes a host system executing application software that performs input/output (I/O) operations to a virtual disk. An input/output (I/O) controller issues I/O requests to the storage disk based on the I/O operations of the application software. The I/O requests use logical sectors having a different sector size format than that of the storage disk. The I/O controller has a sector mapper for mapping logical sectors to physical sectors of the storage disk and for identifying one or more sector edges of physical sectors associated with each logical sector. A sector-edge cache stores sector edges. The I/O controller receives a write request to write data to a logical sector of a virtual disk. The I/O controller maps the logical sector to one or more physical sectors of a storage disk, identifies a sector edge for each physical sector to which the logical sector maps, and retrieves each identified sector edge from the sector-edge cache if the sector-edge cache presently holds a valid entry for that sector edge. The I/O controller combines each retrieved sector edge with the data being written, and writes the data combined with each retrieved sector edge to the one or more physical sectors to which the logical sector maps.

BRIEF DESCRIPTION OF THE DRAWINGS

The above and further advantages of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

FIGS. 8-11 are diagrams illustrating an exemplary partial mapping of logical sectors to physical sectors, wherein the logical sectors are each smaller in bytes than the physical sector and the mapping of each of logical sector produces a leading-sector edge, a trailing-sector edge, or both within each physical sector to which that logical sector maps.

DETAILED DESCRIPTION

The invention features a system and method for avoiding or mitigating a performance penalty associated with pre-reading sector edges from disk, as described herein. Sector edges result when software of a data processing system interacts with physical storage using a differently sized sector format than that of the physical storage. The software issues read and write requests addressed to logical sectors, which are mapped to physical sectors of storage disks. Aligned I/O operations to groups of sectors, called segments, can avert needing to pre-read sector edges; however, small (i.e., smaller in size than one segment) or misaligned write operations require a pre-reading of sector edges so that the pre-read sector edges can be combined with the new data to be written. The combination is then written to disk.

Use of sector-edge caches of the present invention avoids needing to pre-read sector edges for every write operation. A write operation to a logical block may find a previously pre-read sector edge already stored in the cache, thus avoiding the need to perform an I/O operation to obtain the sector edge from the disk. In addition, sector-edge caches can be beneficially combined with a RAID-5 implementation: typically, write operations in a RAID-5 implementation entail a read-modify-write process; thus, sector edges can be read and cached during the read phase of the read-modify-write process. No additional pre-reads are then necessary when combining sector edges with new data during the write phase of the process. The read phase of the read-modify-write process thus absorbs the performance penalty associated with mapping logical sectors to physical sectors.

Figure 1:
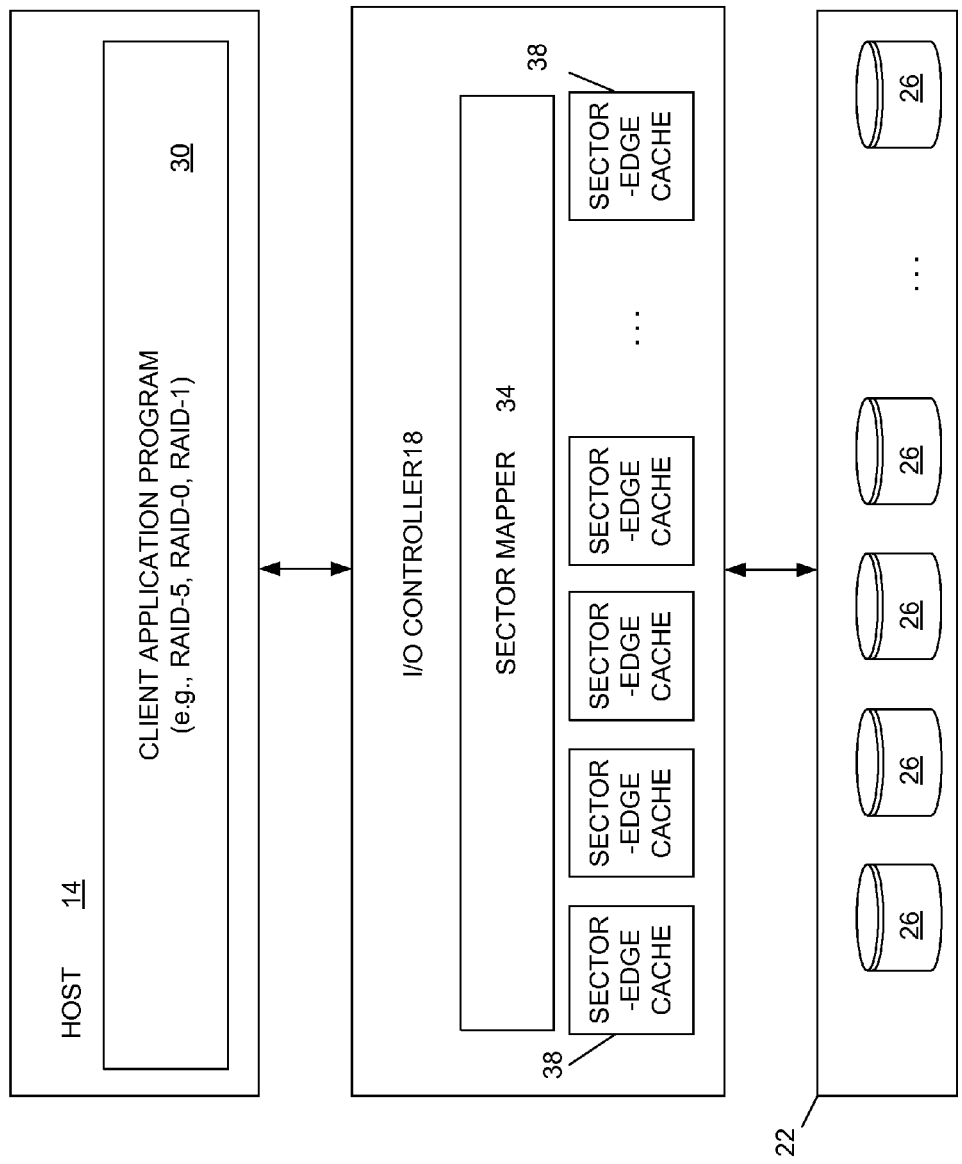
FIG. 1 is a diagram of an embodiment of a data processing system constructed in accordance with the invention, the data processing system including a host, an I/O controller, and an array of disks.

FIG. 1 shows an embodiment of a data processing system 10 constructed in accordance with the invention. The data processing system 10 includes a host system 14, an I/O controller 18, and an array 22 of disks 26. In general, the host system 14 is a processor-based system with persistent storage for storing data and software programs, such as a host application program 30. Examples of host application programs include, but are not limited to, databases, operating systems, and file systems.

The host system 14 is in communication with the I/O controller 18 over a host storage interconnect 28 (e.g., a Fibre Channel bus, SCSI bus). The I/O controller 18 implements an I/O subsystem (e.g., a RAID-0, RAID-1, RAID-5 implementation) for controlling access to the disks 26 in response to read and write I/O operations initiated by the host application program 30. Through the I/O controller 18, this host application program 30 interacts with the disks 26 of the disk array 22, which the I/O controller 18 presents to the host application program 30 as one or more virtual disks 32. In addition, the host application program 30 issues I/O requests to the virtual disks 32 and the I/O controller 18 transforms these I/O requests into I/O requests to the physical disks 26 within the disk array 22.

Each disk 26 in the disk array 22 has a plurality of sectors, referred to herein as physical sectors. The physical sectors have a uniform size in bytes. In accordance with the invention, the sectors referenced in I/O requests issued by the I/O controller 18, hereafter referred to as logical sectors, have a different size than that of the physical sectors on the disks 26. (In general, the size difference may be attributable to the use of additional information (e.g., metadata) by the I/O controller in order to implement the functionality of a particular I/O subsystem). For converting logical sectors referenced by the I/O controller 18 into physical sectors of the disks 26, the I/O controller 18 has a sector mapper 34.

A plurality of sector-edge caches 38 resides, in this embodiment, at the I/O controller 18 for storing sector edges. Each sector-edge cache 38 is associated with one disk 26 in the disk array 22 and caches sector edges obtained from that disk 26. In other embodiments, one cache can support multiple disks or all disks in the disk array. The caches 38 are write-through caches. In general, each sector-edge cache 38 is relatively small in size, e.g., 1 Mb of memory, and can be implemented in high-speed memory, e.g., dynamic RAMs, static RAMs, and synchronous dynamic RAMs. An advantage is that the sector-edge cache 38 saves a significant amount of memory by caching just the sector edges and avoiding having to cache an entire I/O request.

The sector edge data in the caches 38 are never dirty (i.e., contain data not already stored on disk) when the cache entry is valid, the sector edge data mirrors the data physically present on the disk from which that data was obtained. In addition to the sector edge data, each cache entry in a sector-edge cache 38 also has other associated data, for example, an address tag (to indicate the physical address), control bits (i.e., to indicate whether the cache entry is valid and when the cache entry was most recently used). During a read operation from disk, the I/O controller 18 adds one or more sector edges to the sector-edge cache 38 or overwrites one or more sector edges currently in the cache 38. During a write operation to disk, the I/O controller 18 may invalidate one or more sector edges currently in the cache to indicate that the data no longer matches the data on the disk(s) 26.

In a preferred embodiment, the data processing system 10 is a networked storage system in which the I/O controller 18 operates as a storage processor, having a Fibre Channel front end and a Serial ATA back end (i.e., disks 26 are ATA disk drives), and provides a RAID-5 implementation. The RAID-5 implementation performs a parity calculation on data written to disk. This parity calculation occurs in real time and is part of the typical read-modify-write process of RAID-5. The written data and parity data are "striped" across the disks 26 in the disk array 22; corresponding sectors on the disks 26 define a stripe. If one disk 26 in the disk array fails, RAID-5 recreates the lost data on the failing disk from the parity data and data blocks on the remaining disks.

For each write request, the RAID-5 system performs multiple I/O operations as part of the read-modify-write process. One I/O operation reads in the data blocks of a stripe to be updated with new data, and another reads the parity block associated with the data blocks. In accordance with the principles of the invention, the read I/O operation also causes the sector edges associated with the data and parity blocks to be cached in the sector-edge cache 38. Then, the parity is modified to reflect the new data. Subsequently, another I/O operation writes the updated parity to the parity block and the new data to the data blocks.

Also, in the preferred embodiment, ATA disk drives have 512-byte physical sectors and the RAID-5 implementation employs 520-byte sectors. Principles of the invention also apply, however, when the logical sectors have fewer bytes than the physical sectors, as described further below. It is to be understood that this preferred embodiment is but one example of the various system configurations in which the invention may be practiced. For example, other levels of RAID, such as RAID-0 and RAID-1, can practice the invention, although not as beneficially as a RAID-5 implementation, because RAID-0 and RAID-1 do not perform read-modify-write processes like RAID-5. Further, when issuing I/O requests to the virtual disks 32, as presented by the I/O controller 18, different embodiments of the host application program 30 can use sectors (which can also be considered logical sectors) having a sector size format that is the same as or differs from that of the physical disks 26.

Figure 2:
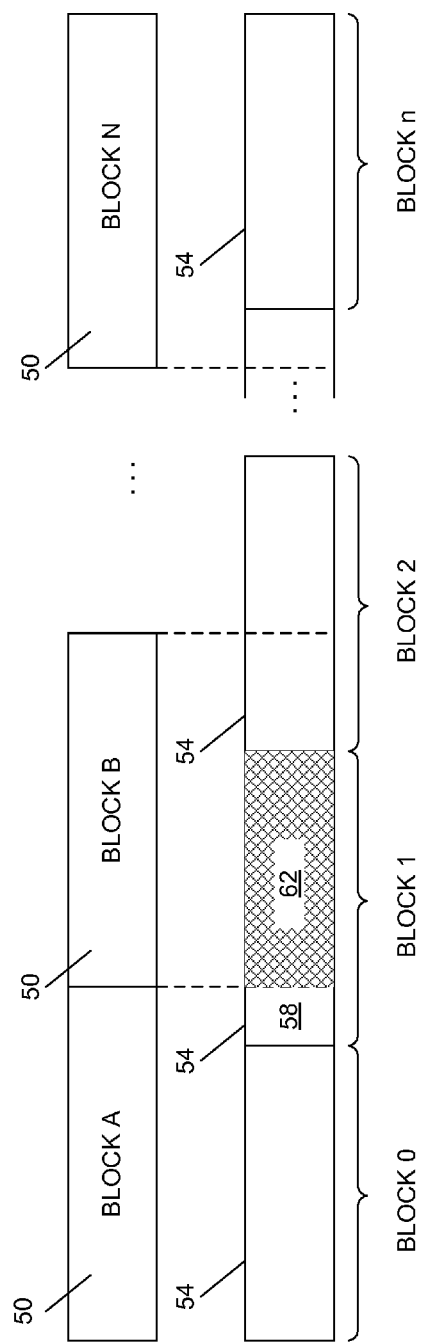
FIGS. 2-4 are diagrams illustrating an exemplary partial mapping of logical sectors to physical sectors, wherein logical sectors are each larger in bytes than physical sectors and the mapping of each logical sector produces a leading sector edge, a trailing sector edge, or both within each physical sector to which that logical sector maps.

FIG. 2 illustrates part of an exemplary mapping in which logical sectors 50 are greater in length than the physical sectors 54. In this example, the logical sectors are each 520 bytes in length and the physical sectors are 512 bytes in length. A general algorithm for mapping 520-byte logical sectors to 512-byte physical sectors, provided there are no discontinuities in the mapping or unused addresses, is as follows:

$LBA_{512}=(LBA_{520}*520)/512$—this is integer math that discards the remainder.

$OFFSET_{512}=(LBA_{520}* 520)\%512$—this is a modulo function.

where $LBA_{512}$ is the physical sector that contains the start of the data corresponding to the logical sector $LBA_{520}$, and where $OFFSET_{512}$ represents the byte offset within physical sector $LBA_{512}$ that contains the first byte of logical sector $LBA_{520}$. The form (Sector, Offset) represents the address of the 520-byte sector data in the 512-byte sector address space. To read all of the data for sector $LBA_{520}$ requires reading the data from physical address ($LBA_{512}$, $OFFSET_{512}$) through physical address ($LBA_{512+1}$, $(OFFSET_{512}+520-1)\%512$). This algorithm applies to single sectors (i.e., not to multiple sector requests).

As shown, the logical sectors 50 includes data blocks labeled block A, block B, and block N; the physical sectors 54 include data blocks labeled block 0, block 1, block 2, and block n. Indicated by ellipses, but not shown, are the other intermediate logical and physical sectors. Hereafter, the data blocks of logical sectors 50 are also called logical blocks and those of physical sectors 54, physical blocks. As an illustrative example, logical block A maps to the entirety of physical block 0 and to a leading portion 58 of physical block 1. The portion 62 of physical block 1 to which the logical block A does not map is referred to as a trailing sector edge because this unmapped portion 62 trails (i.e., follows in address) the mapped leading portion 58. Accordingly, logical block A has an associated trailing sector edge, but no associated leading sector edge.

Figure 3:
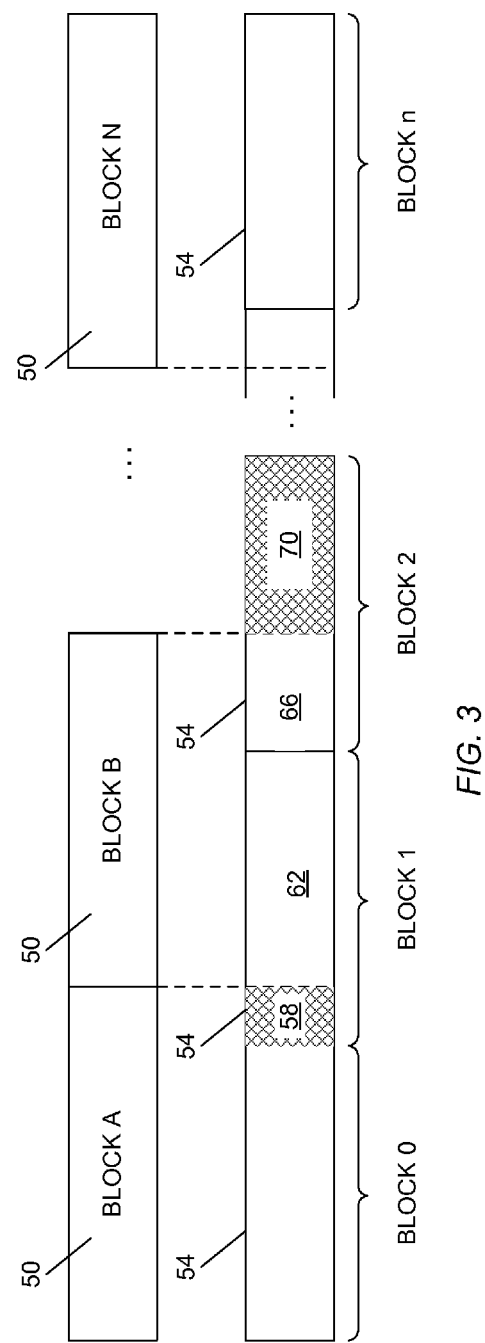

FIG. 3 shows the exemplary mapping of FIG. 2 with particular reference to the logical block B. Block B maps to the portion 62 of physical block 1 and to a leading portion 66 of physical block 2. Accordingly, portion 62 of physical block 1 corresponds to a trailing sector edge with respect to logical block A (FIG. 2) and sector data with respect to logical block B. Here, the leading portion 58 of physical block 1 is a leading sector edge and a trailing portion 70 of physical block 2 is a trailing sector edge. Accordingly, the portion 58 of physical block 1 corresponds to sector data with respect to logical block A and a leading sector edge with respect to logical block B. A write operation directed to logical block A can change the data content of portion 58 of physical block 1, thus operating to invalidate any cached version of portion 58 as a leading sector edge associated with logical block B. Similarly, a write operation directed to logical block B can change the data content of portion 62 of physical block 1, thus operating to invalidate any cached version of portion 62 as a trailing sector edge associated with logical block A.

Figure 4:
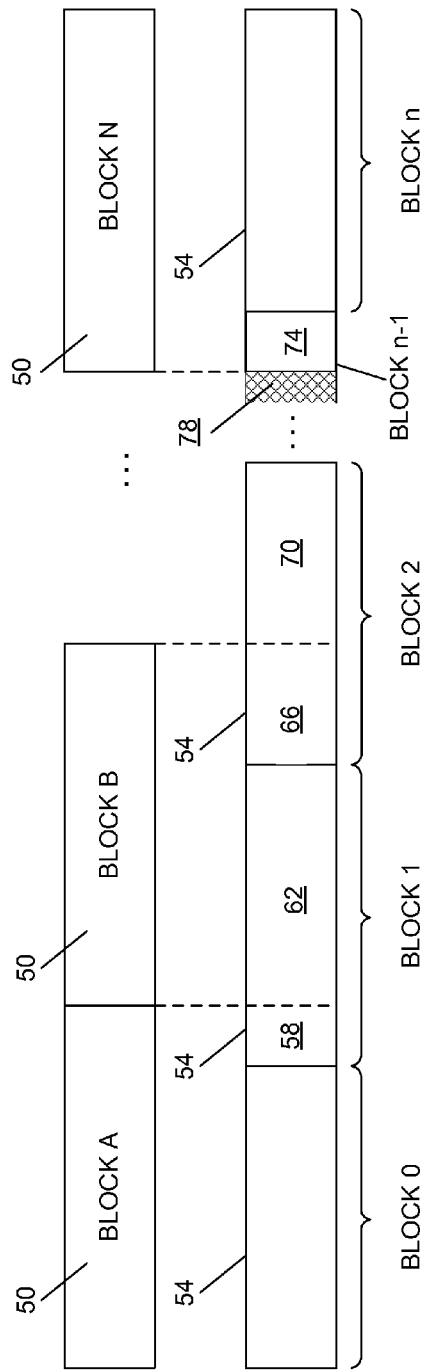

FIG. 4 shows again the exemplary mapping of FIG. 2, here with particular reference to the mapping of logical block N to physical sectors n and n−1. Block N maps to a trailing portion 74 of physical block n−1 and to the entirety of block n. Block N does not map to a leading portion 78 of physical block n−1.

Accordingly, this particular logical-to-physical sector mapping produces a leading sector edge, but no trailing sector edge. Using 520-byte logical sectors and 512-byte physical sectors, for example, a last-address alignment between a logical sector and a physical sector occurs at every $64^{th}$ logical sector and every $65^{th}$ physical sector.

I/O access of uniformly sized segments that achieve a last-address alignment between a logical sector and a physical sector, e.g., a segment comprised of 64 520-byte logical sectors mapped to 65 512-byte physical sectors, have an advantage of not needing to pre-read sector edges during an aligned write operation to a segment. Another advantage is that such segment sizes fully utilize the storage capacity of the disk 26, in comparison with other segment sizes as described in Table 1 below.

Figure 5:
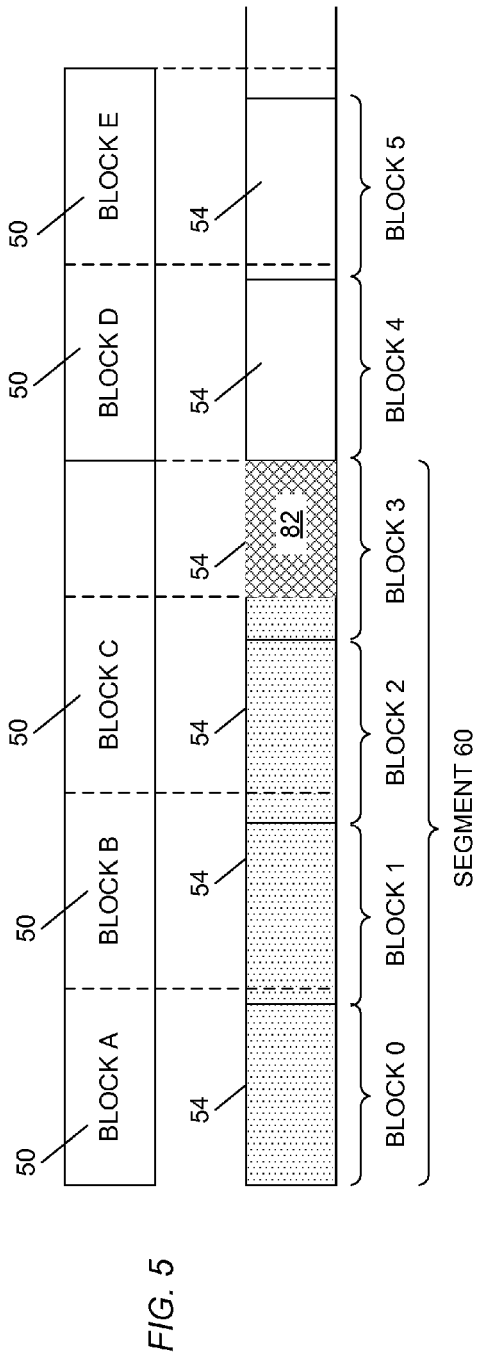
FIG. 5 is a diagram illustrating an exemplary partial mapping of logical sectors to physical sectors adapted for aligned I/O operations using uniformly sized segments each comprised of a predetermined number of sectors.

FIG. 5 shows an example in which the definition of a segment comprises four physical sectors. As shown, one segment 60 (shaded) has four physical data blocks labeled block 0, block 1, block 2, and block 3. In this example, each block is a 512-byte physical block. Block 4 and every fourth physical block thereafter is the start of a new segment.

Also shown is an exemplary mapping of 520-byte logical blocks to the 512-byte physical blocks. Three logical blocks, comprised of block A, block B, and block C, map to the four physical blocks: block 0, block 1, block 2, and block 3. The mapping ensures that there is an alignment with the start address of a logical block with the starting address of the first block of each segment (e.g., block A and block 0, block D and block 4). As shown, a segment size of four physical sectors consequently does not produce a last-address alignment between any logical block and physical block. Accordingly, several physical addresses are unusable, as indicated by portion 82. Notwithstanding, the loss of address space may be an acceptable tradeoff in order to benefit from improved write performance (e.g., not having to pre-read sector-edges). Other segment sizes—again, with reference to 520-byte logical sectors and 512-byte physical sectors—also result in unusable physical addresses. For example, segment sizes of 8, 16, and 32 logical blocks also have a degree of lost address space. No address loss occurs when the segment size is an integer multiple of 64 (520-byte) logical blocks (i.e., 65 (512-byte) physical blocks). Table 1 below compares exemplary segment sizes with the percentage of unused storage capacity:

TABLE 1

| Segment Size (in 520-byte blocks/512-byte blocks) | Approx. Percentage of Unusable Address Space |
| --- | --- |
| 64/65 | 0% |
| 32/33 | 1.5% |
| 16/17 | 4.4% |
| 8/9 | 9.7% |

Figure 6:
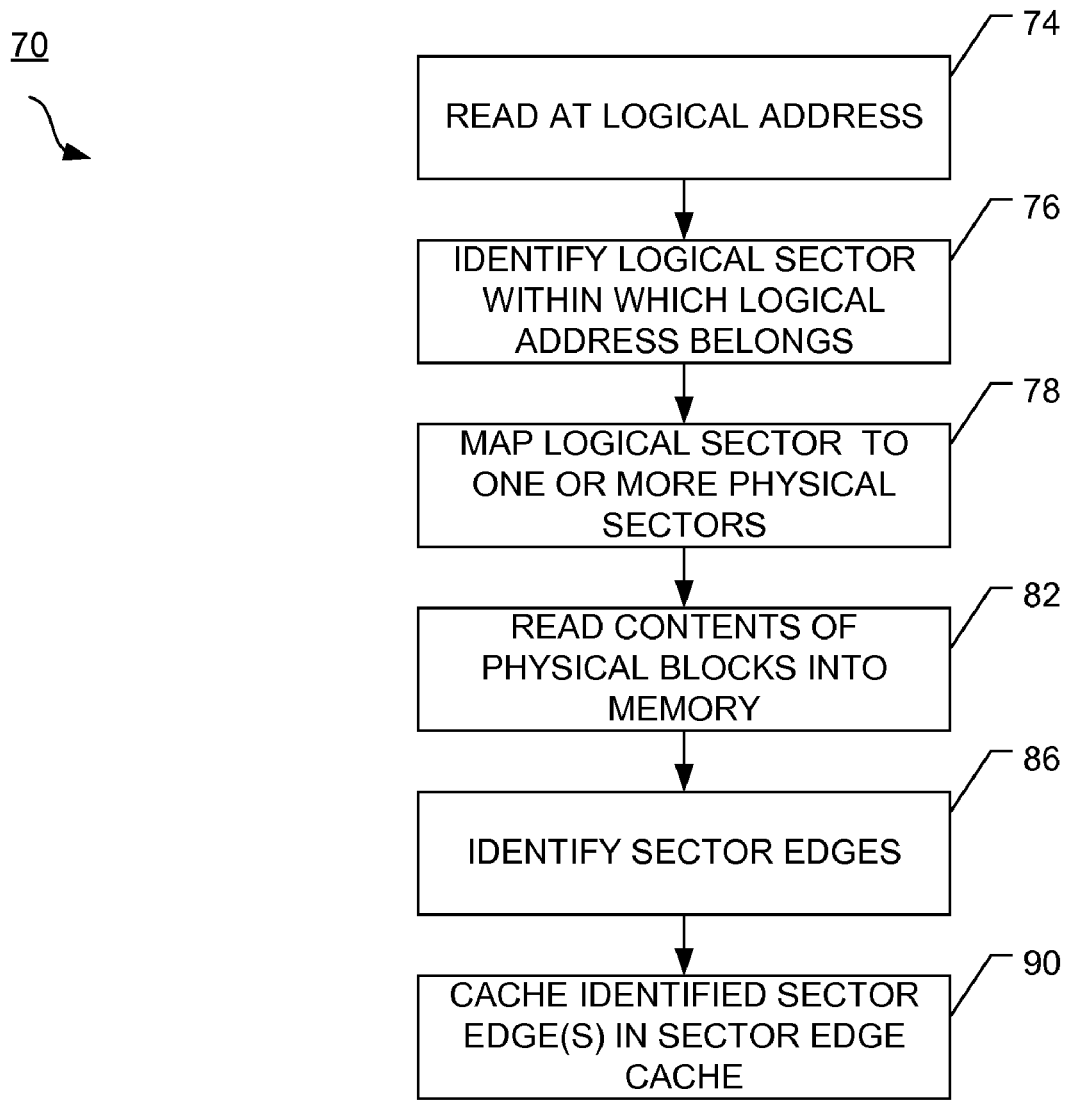
FIG. 6 is a flow diagram of an embodiment of a process for reading data from a physical disk in response to a read request.

FIG. 6 shows an embodiment of a process 70 for reading data from physical sectors of the disks 26 and caching sector edges in accordance with the invention. At step 74, the application program 30 issues a read request for data at a logical address. This logical address falls within a particular logical sector (step 76). The sector mapper 34 maps (step 78) the logical sector to one or more physical sectors of a given disk. If logical sectors are larger in bytes than physical sectors, then the mapping identifies at least two physical sectors. If logical sectors are smaller than physical sectors, then the mapping identifies one or, at most, two physical sectors.

Data blocks are read (step 82) from each identified physical block. At step 86, the I/O controller 18 identifies each sector edge resulting from the logical-to-physical sector mapping.

An identified sector edge can be a leading sector edge, trailing sector edge, or both, depending upon the referenced logical sector and the particular mapping of that logical sector to the physical sectors. In accordance with the invention, the I/O controller 18 stores (step 90) each identified sector edge in the sector-edge cache 38 associated with the given disk. If, at the time of caching a sector edge, the sector-edge cache 38 is currently full of valid cache entries, the oldest entry (i.e., least recently used) is removed to make room for the new sector edge. If the sector-edge cache 38 currently contains an entry for the sector edge being cached, in one embodiment that entry is overwritten. Overwriting the cache entry, in effect, changes the aging status of the existing entry for subsequent determinations of a least recently used entry and, if the existing entry is currently invalid, restores a valid status.

With reference also to FIG. 3, the read operation is illustrated by example. Consider that the application program issues a read request for data at logical block B. Mapping logical block B to physical blocks 1 and 2 identifies a leading sector edge 58 from physical block 1 and a trailing sector edge 70 from physical block 2. The I/O controller 18 stores the leading sector edge 58 and the trailing sector edge 70 in the sector-edge cache 38 and sector data from portion 62 of physical block 1 and from portion 66 of physical block 2 are returned to the application program 30 to satisfy the read request.

Figure 7:
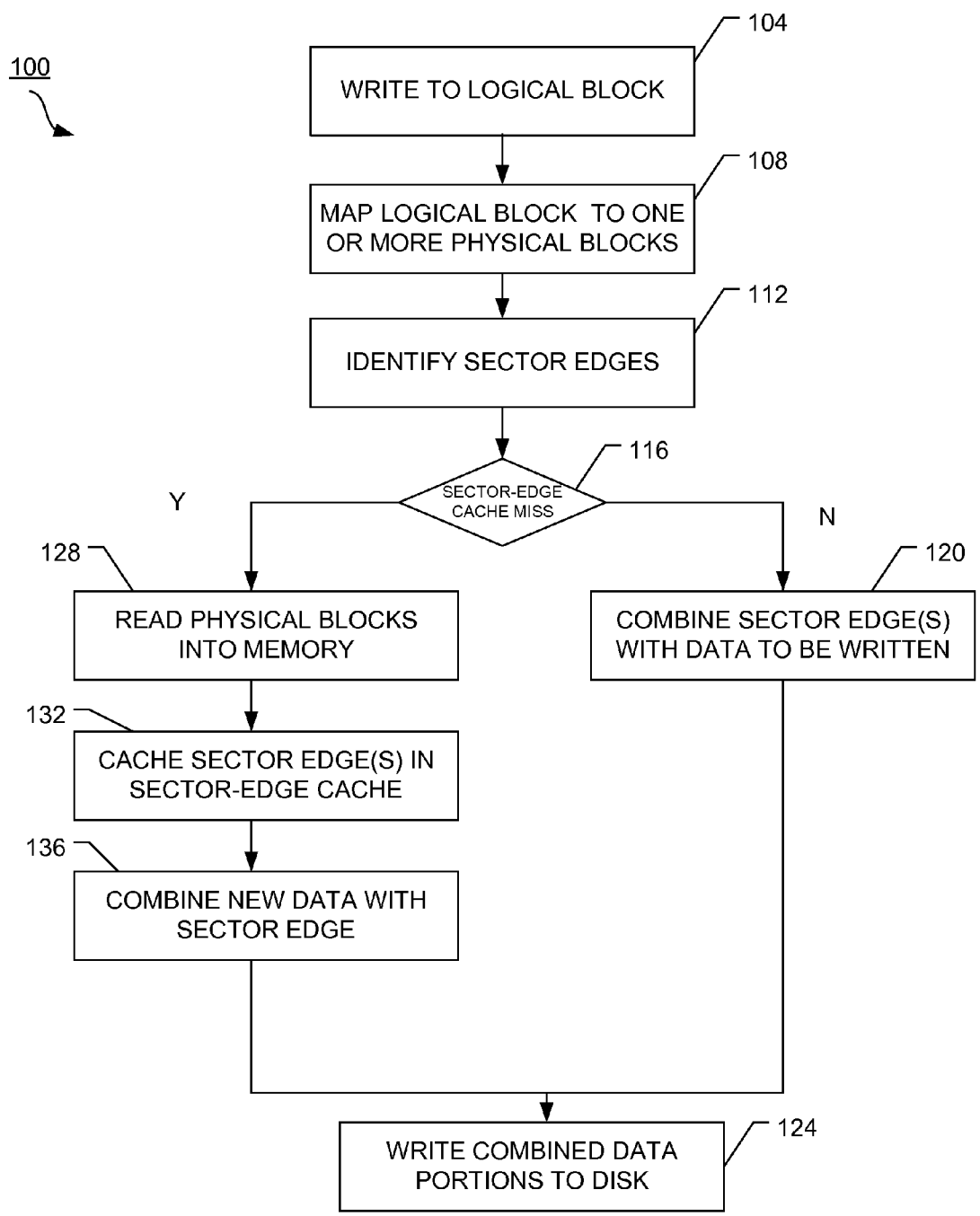
FIG. 7 is a flow diagram of an embodiment of a process for writing data to a physical disk in response to a write request.

FIG. 7 shows an embodiment of a process 100 for writing data to physical sectors of disks 26 using the sector-edge cache 38 of the invention. At step 104, the application program 30 issues a write request to change data at a logical sector. The sector mapper 34 maps (step 108) the logical sector to one or more physical sectors of a given disk. The controller 18 computes (step 112) each sector edge (leading, trailing, or both) associated with this logical sector. At step 116, the I/O controller 18 accesses the sector-edge cache 38 associated with the given disk to determine if the sector edge (s) are currently cached.

If the sector-edge cache 38 has an entry for each sought-for sector edge, and that entry is valid, the I/O controller 18 combines (step 120) a portion of the new data to be written with that sector edge. For instance, any leading sector edge is prepended to and any trailing sector edge is appended to the new data. The combination of each sector edge with an appropriate portion of the new data is then written (step 124) to the physical sector. Thus, the caching of sector edges can avoid the need to pre-read the contents of a physical block in order to perform a write operation to that physical block.

For example, consider a write request to the logical block B of FIG. 3. Again, logical block B maps to physical blocks 1 and 2, producing a leading sector edge 58 for physical block 1 and a trailing sector edge 70 for physical block 2. Consider also that the I/O controller 18 finds the leading sector edge 58 and trailing sector edge 70 in the sector-edge cache 38—and both entries are valid. The I/O controller 18 then produces data to be written to physical block 1 by prepending the leading sector edge 58 to a first portion of new data of logical block B. This portion corresponds to the portion 62 of physical block 1. The I/O controller 18 also produces data to be written to physical block 2 by appending the trailing sector edge 70 to a second portion of new data of logical block B. This portion corresponds to the portion 66 of physical block 2. The I/O controller 18 then writes the union of the leading sector edge 58 and first portion of new data to physical block 1, and the union of the trailing sector edge 70 and the second portion of new data to physical block 2.

The writing of new data to one or more physical blocks can cause changes within the sector-edge cache 38. Continuing with the previous example, writing new data to logical block B results in new data being written to physical blocks 1 and 2. Specifically, as shown in FIG. 3, new data is written to address portion 62 of physical block 1 and to address portion 66 of physical block 2. These address portions 62, 66 can also correspond to cached sector-edges: address portion 62 can be a trailing sector edge for reading and writing to logical block A, as shown in FIG. 2, and address portion 66 can be a leading sector edge for reading and writing to logical block C (not shown). If either or both of these sector edges are currently cached in the sector-edge cache 38, writing to logical block B results in invalidating their associated cache entries.

Referring again to FIG. 7, if, instead, the sector-edge cache 38 does not currently have an entry for each sought-for sector edge, the I/O controller 18 reads (step 128) data from the physical block(s) to which the logical block maps, stores (step 132) each sector edge—determined in step 116—into the sector-edge cache 38 associated with the given disk 26, combines (step 120) a portion of the new data to be written with each sector edge and writes (step 124) the combined data to the appropriate physical sector(s).

Because a sector edge associated with one logical sector can also hold sector data for associated with another logical sector, read-modify-write operations are atomic so that the sector edges cannot be modified during the write operation. Accordingly, the data processing system 10 of the invention employs a locking strategy that covers physical sectors. Locks on physical sectors are given to I/O requests on a first-come-first-serve basis. In addition, if the data processing system 10 has multiple storage processors that can access the same disk, no more than one storage processor at a time can modify a given physical sector of that disk.

The read-modify-write process of a RAID-5 implementation suits well the process of pre-reading and caching of sector edges. Because a RAID-5 write operation pre-reads data and parity from a disk in order to recalculate parity before the write to disk occurs, this pre-read can also serve to obtain and cache sector edges. Thus, embodiments that combine a RAID-5 implementation with sector-edge caches can absorb the performance penalty associated with pre-reading sector edges during the logical sector-to-physical sector conversion. Further, employing a segment size that achieves no address loss, e.g., sixty-four 520-byte/sixty-five 512-byte segments, can optimize a design of the data processing system 10 based on cost and storage capacity.

Other levels of RAID implementations, e.g. RAID-1, which do not employ a read-modify-write process when performing a write operation, can incur the performance penalty associated with pre-reading sector edges. Notwithstanding, such RAID implementations can benefit during a subsequent write to physical blocks for which sector edges are already cached and currently valid.

As noted above, in some embodiments of the invention, logical sectors can be smaller in bytes than physical sectors. For example, FIG. 8 illustrates a partial exemplary mapping in which the logical sectors 50 are each 520 bytes in length and the physical sectors 54' are 1024 bytes in length. The logical sectors 50 includes block A, block B, block C, block D, and block N; the physical sectors 54 include block 0, block 1, block 2, and block n. Indicated by ellipses, but not shown, are the other intermediate logical and physical sectors. As an illustrative example, the entire logical block A maps to the physical block 0 and leaves an unmapped portion 150, which is a trailing sector edge. Accordingly, reads to logical block A result in caching the associated trailing sector edge.

FIG. 9 shows the exemplary mapping of FIG. 8 with particular reference to the logical block B. Block B spans two physical blocks, block 0 and block 1 and maps to a trailing portion 154 of physical block 0 and to a leading portion 158 of physical block 1. Block B does not map to a leading portion 162 of physical block 0 or to a trailing portion 166 of physical block 1. For this particular logical-to-physical sector mapping for logical block B, the leading portion 162 is a leading sector edge and the trailing portion 166 is a trailing sector edge.

FIG. 10 shows again the exemplary mapping of FIG. 8, here with particular reference to the mapping of logical block C to physical sectors. The entirety of block C maps to an intermediate portion 170 within physical block 1 and does not map to a leading portion 174 or to a trailing portion of this same physical block. Accordingly, this particular logical-to-physical sector mapping produces a leading sector edge (portion 174) and a trailing sector edge (portion 178), both of which are part of the same physical sector (block 1).

FIG. 11 shows again the exemplary mapping of FIG. 8, here with particular reference to the mapping of logical block N to physical block n. The entire logical block N maps to a trailing portion 182 of physical block n, leaving an unmapped leading sector edge 186. Accordingly, read and write operations to logical block N can result in caching the leading sector edge 186. Using 520-byte logical sectors and 1024-byte physical sectors, for example, a last-address alignment between a logical-to-physical sector mapping occurs every $128^{th}$ logical sector and every $65^{th}$ physical sector.

While the invention has been shown and described with reference to specific preferred embodiments, it should be understood by those skilled in the art that various changes in form and detail may be made therein without departing from the spirit and scope of the invention as defined by the following claims. For instance, the principles of caching sector edges apply generally to any software that interacts with physical storage using a differently sized sector format than that of the physical storage, and not just specifically between the logical sectors as specified by the I/O controller and the physical sectors of the disk.

What is claimed is:

1. A method of handling input/output (I/O) requests to a storage disk, wherein the I/O requests use a different sector size format than that of the storage disk, the method comprising:
    receiving a write request to write data to a logical sector of a virtual disk;
    mapping the logical sector to one or more physical sectors of a storage disk;
    identifying a sector edge for each physical sector to which the logical sector maps;
    retrieving each identified sector edge from a sector-edge cache if the sector-edge cache presently holds a valid entry for that sector edge;
    combining each retrieved sector edge with the data being written; and
    writing the data combined with each retrieved sector edge to the one or more physical sectors to which the logical sector maps.

2. The method of claim 1, further comprising:
    if the sector-edge cache holds an invalid entry for an identified sector edge, reading that sector edge from the storage disk and overwriting the invalid entry in the sector-edge cache with the sector edge read from the storage disk.

3. The method of claim 2, wherein the step of reading the sector edge from the storage disk occurs during a read stage of a RAID-5 read-modify-write operation.

4. The method of claim 1, wherein the data to be written to the storage disk changes the data of a previously cached sector edge, and further comprising the step of invalidating a cache entry in the sector-edge cache associated with that previously cached sector edge.

5. The method of claim 1, wherein the storage disk has a physical sector that is smaller in size than the logical sector.

6. The method of claim 1, further comprising the step of performing segment-sized aligned I/O operations, wherein a segment is comprised of a predetermined number of logical sectors.

7. The method of claim 6, wherein the number of logical sectors in the segment maps evenly to a number of physical sectors of the storage disk to utilize the storage disk without loss of storage capacity of the storage disk.

8. The method of claim 1, wherein the storage disk is an Advanced Technology Attachment disk.

9. A data processing system having a storage disk with physical sectors, the data processing system comprising:
    a host system executing application software that performs input/output (I/O) operations to a virtual disk;
    an input/output (I/O) controller for issuing I/O requests to the storage disk based on the I/O operations of the application software, the I/O requests using logical sectors having a different sector size format than that of the storage disk, the I/O controller having a sector mapper for mapping logical sectors to physical sectors of the storage disk and for identifying one or more sector edges of physical sectors associated with each logical sector; and
    a sector-edge cache storing sector edges,
    wherein the I/O controller receives a write request to write data to a logical sector of a virtual disk, maps the logical sector to one or more physical sectors of a storage disk, identifies a sector edge for each physical sector to which the logical sector maps, determines if the sector-edge cache presently holds a valid entry for each determined sector edge, retrieves each valid sector edge from the sector-edge cache, combines each retrieved sector edge with the data being written, and writes the data combined with each retrieved sector edge to the one or more physical sectors to which the logical sector maps.

10. The data processing system of claim 9, wherein the logical sectors are each larger in bytes than each physical sector.

11. The data processing system of claim 9, wherein if the sector-edge cache holds an invalid entry for an identified sector edge, the I/O controller reads that sector edge from the storage disk and overwrites the invalid entry in the sector-edge cache with the sector edge read from the storage disk.

12. The data processing system of claim 11, wherein the I/O controller performs the read of the sector edge during a read stage of a RAID-5 read-modify-write operation.

13. The data processing system of claim 9, wherein the storage disk is an Advanced Technology Attachment disk.

14. The data processing system of claim 9, wherein the application software performs aligned I/O operations of a segment size comprised of a plurality of sectors.

15. The data processing system of claim 14, wherein the segment size evenly maps a first number of logical sectors of the virtual disk to a second number of physical sectors of the storage disk to utilize the storage disk without loss of storage capacity of the storage disk.

* * * * *